(12) United States Patent
Larsen et al.

(10) Patent No.: US 9,880,066 B2
(45) Date of Patent: Jan. 30, 2018

(54) TRANSDUCER CALIBRATION APPARATUS

(71) Applicant: Michigan Scientific Corporation, Milford, MI (US)

(72) Inventors: Hugh Larsen, Milford, MI (US); Scott K. Rhudy, Petoskey, MI (US); Ryan F. Giem, Boyne City, MI (US); Adam B. Manninen, Petoskey, MI (US); Joel Schnackenberg, Charlevoix, MI (US); John L. Cancilla, Charlevoix, MI (US); Ralph W. Larsen, Charlevoix, MI (US)

(73) Assignee: Michigan Scientific Corporation, Milford, MI (US)

(*) Notice: Subject to any disclaimer, the term of this patent is extended or adjusted under 35 U.S.C. 154(b) by 157 days.

(21) Appl. No.: 15/074,456

(22) Filed: Mar. 18, 2016

(65) Prior Publication Data

US 2016/0273990 A1  Sep. 22, 2016

Related U.S. Application Data

(60) Provisional application No. 61/996,992, filed on Mar. 18, 2015.

(51) Int. Cl.
*G01L 25/00* (2006.01)
*G01M 7/06* (2006.01)
*G01L 5/16* (2006.01)

(52) U.S. Cl.
CPC .............. *G01L 25/00* (2013.01); *G01L 5/16* (2013.01); *G01M 7/06* (2013.01)

(58) Field of Classification Search
CPC ........ G01M 7/06; G01M 13/027; G01M 7/04; G01M 7/025
See application file for complete search history.

(56) References Cited

U.S. PATENT DOCUMENTS

| | | | | |
|---|---|---|---|---|
| 2,141,639 A | * | 12/1938 | Catalano | B60S 9/10 73/669 |
| 2,383,491 A | * | 8/1945 | Kemmer | G01M 5/0016 73/798 |
| 2,890,584 A | * | 6/1959 | Dickie | G01M 7/022 73/665 |
| 3,877,288 A | * | 4/1975 | Schiefen | G01M 17/04 73/11.08 |
| 4,263,809 A | * | 4/1981 | Petersen | G01M 13/027 73/116.01 |
| 4,658,656 A | * | 4/1987 | Haeg | G01M 13/027 73/669 |

(Continued)

*Primary Examiner* — David A Rogers
(74) *Attorney, Agent, or Firm* — Young Basile Hanlon & MacFarlane, P.C.

(57) ABSTRACT

An ideal multi-axis transducer will respond properly to forces and moments that are applied in intermediate directions. The transducer calibration apparatus described herein can detect transducers that have incorrect off-axes response. One calibration apparatus includes a base, a pair of end stanchions fixed on the base, force actuators mounted between the base, the pair of end stanchions, and a transducer holder, the force actuators arranged to exert forces and moments on a transducer mounted in the transducer holder, and force reaction sensors fixed between the base, the pair of end stanchions, and the transducer holder for measuring forces and moments experienced by the transducer holder.

20 Claims, 6 Drawing Sheets

(56) References Cited

U.S. PATENT DOCUMENTS

| | | | | |
|---|---|---|---|---|
| 4,689,998 A * | 9/1987 | Jackson | G01M 17/0078 | 73/669 |
| 5,241,856 A * | 9/1993 | Petersen | G01M 13/027 | 73/115.07 |
| 5,279,144 A * | 1/1994 | Levkowitch | G01G 23/01 | 16/367 |
| 5,545,040 A * | 8/1996 | Lu | G09B 9/02 | 434/29 |
| 5,696,319 A * | 12/1997 | Chung | G01M 99/00 | 606/57 |
| 5,752,834 A * | 5/1998 | Ling | G09B 9/12 | 434/55 |
| 6,035,715 A * | 3/2000 | Porter | G01M 7/02 | 73/432.1 |
| 6,324,919 B1 | 12/2001 | Larsen et al. | | |
| 6,382,020 B1 * | 5/2002 | Fischer | G01M 17/022 | 73/146 |
| 6,431,872 B1 * | 8/2002 | Shiraishi | G09B 9/05 | 273/442 |
| 6,439,063 B1 | 8/2002 | Schnackenberg | | |
| 6,564,626 B2 * | 5/2003 | Ulman | G01L 5/16 | 73/147 |
| 6,729,178 B2 * | 5/2004 | Leska, Sr. | G01M 17/04 | 73/115.07 |
| 7,146,859 B2 * | 12/2006 | Dittmann | G01M 13/027 | 73/669 |
| 7,254,995 B2 * | 8/2007 | Leska, Sr. | G01M 17/022 | 73/146 |
| 7,401,520 B2 * | 7/2008 | Parison | G01M 7/04 | 73/669 |
| 7,421,906 B2 * | 9/2008 | Saves-Saint-Germes | G01M 5/005 | 73/802 |
| 7,461,556 B2 * | 12/2008 | Hamilton | G01M 7/00 | 73/117.03 |
| 7,540,195 B2 * | 6/2009 | Nelsen | G01M 7/022 | 73/666 |
| 8,453,512 B2 * | 6/2013 | Sasso | G01C 19/72 | 73/663 |
| 8,453,522 B2 * | 6/2013 | Bushey | G01M 13/027 | 73/862.581 |
| 8,800,346 B2 | 8/2014 | Murashige et al. | | |
| 9,052,250 B1 * | 6/2015 | Parker | G01L 25/00 | |
| 9,280,918 B2 * | 3/2016 | Martinez | G01M 7/027 | |
| 9,354,134 B2 * | 5/2016 | Commo | G01M 9/062 | |
| 9,454,911 B2 * | 9/2016 | Finigan | G09B 9/10 | |
| 9,651,449 B2 * | 5/2017 | Warmerdam | G09B 9/00 | |
| 9,666,093 B2 * | 5/2017 | In | G09B 9/04 | |
| 2002/0011102 A1 * | 1/2002 | Leska, Sr. | G01M 17/04 | 73/146 |
| 2003/0108379 A1 * | 6/2003 | Bushey | F16C 11/06 | 403/51 |
| 2005/0042578 A1 * | 2/2005 | Ammon | G09B 9/04 | 434/62 |
| 2005/0277092 A1 * | 12/2005 | Hwang | G09B 9/12 | 434/55 |
| 2006/0059993 A1 * | 3/2006 | Temkin | G01M 17/007 | 73/669 |
| 2007/0018511 A1 * | 1/2007 | Schulz | A63G 31/16 | 73/118.01 |
| 2007/0022821 A1 * | 2/2007 | Saves-Saint-Germes | G01M 5/005 | 73/802 |
| 2008/0229836 A1 * | 9/2008 | Melz | G01M 7/06 | 73/669 |
| 2008/0277553 A1 * | 11/2008 | Bechtold | F16C 29/046 | 248/346.03 |
| 2009/0056458 A1 * | 3/2009 | Ma | G01M 7/06 | 73/663 |
| 2009/0249899 A1 * | 10/2009 | Wong | G01M 7/022 | 73/865.6 |
| 2010/0031740 A1 * | 2/2010 | Olex | G01M 17/013 | 73/146 |
| 2011/0028224 A1 * | 2/2011 | Bushey | G01M 13/025 | 464/27 |
| 2011/0308296 A1 * | 12/2011 | Sasso | G01C 19/72 | 73/1.77 |
| 2012/0227515 A1 * | 9/2012 | Guy | F03D 11/0091 | 73/862.627 |
| 2012/0297858 A1 | 11/2012 | Sumimoto et al. | | |
| 2015/0323414 A1 * | 11/2015 | In | G09B 9/04 | 73/11.07 |
| 2017/0138816 A1 * | 5/2017 | Proulx | G01M 7/025 | |

\* cited by examiner

US 9,880,066 B2

TRANSDUCER CALIBRATION APPARATUS

CROSS-REFERENCE TO RELATED APPLICATION

This application claims priority to U.S. provisional patent application No. 61/996,992, filed on Mar. 18, 2015.

BACKGROUND

A transducer, together with appropriate instrumentation, is used to measure forces in a variety of applications. Consequently, different types of transducers are commercially available. They include elastic devices such as strain gauges, piezoelectric crystals, pressure-responsive devices such as hydraulic or pneumatic load cells, etc. Transducer elements may comprise different shapes, namely beams, circular rings, cylinders, etc. The output signal of a transducer may be an electrical signal or a mechanical indication that correlates to an applied force. Provided that the transducer is calibrated to known forces, the applied force can be determined from the output signal.

SUMMARY

One aspect of a force transducer calibration apparatus described herein includes a base, a pair of end stanchions fixed on the base, force actuators mounted between the base, the pair of end stanchions, and a transducer holder, the force actuators arranged to exert forces and moments on a transducer mounted in the transducer holder, and force reaction sensors fixed between the base, the pair of end stanchions, and the transducer holder for measuring forces and moments experienced by the transducer holder.

Another aspect of a force transducer calibration apparatus described herein includes a base, a first end stanchion fixed on the base, a second end stanchion fixed on the base, a first force actuator mounted between the base and a transducer holder, a first reaction force sensor mounted between the base and the transducer holder, a second force actuator mounted between the first end stanchion and the transducer holder, a second reaction force sensor mounted between the first end stanchion and the transducer holder, a third force actuator mounted between the second end stanchion and the transducer holder, and a third reaction force sensor mounted between the second end stanchion and the transducer holder. The first force actuator and the first reaction force sensor are arranged orthogonally to the second force actuator and the second reaction force sensor, and to the third force actuator and the third reaction force sensor.

Another aspect of a force transducer calibration apparatus described herein includes a base, a first end stanchion affixed to the base, a second end stanchion affixed to the base, a transducer holder, the transducer holder coupled to the base by at least one force actuator and at least one reaction force sensor, the transducer holder coupled to the first end stanchion by at least one force actuator and at least one reaction force sensor, and the transducer holder coupled to the second end stanchion by at least one force actuation and at least one reaction force sensor, and a controller that controls the force actuators to exert at least one of a force or a moment on the transducer holder to thereby deform a transducer, and that receives at least one of a force or a moment measured by the reaction force sensors for comparison with outputs from the transducer.

Details of these and other aspects and implementations of the force transducer calibration apparatus described herein are discussed in additional detail below.

BRIEF DESCRIPTION OF THE DRAWING

The description herein makes reference to the accompanying drawings described below wherein like reference numerals refer to like parts throughout the several views.

DETAILED DESCRIPTION

An ideal multi-axis transducer will respond properly to forces and moments that are applied in intermediate directions. For example, a force that is applied at 45° to the principle axes of the transducer should produce a transducer output of equal value in the principle axes and equal to the applied force divided by the square root of two. Some transducers have incorrect responses to off-axes forces. This can result in a rippled output in the case of rotating force application, such as may occur with wheel force transducers. A transducer calibration apparatus 10 described herein can easily detect incorrect off-axes responses, in addition to detecting incorrect on-axes responses.

Figure 1:
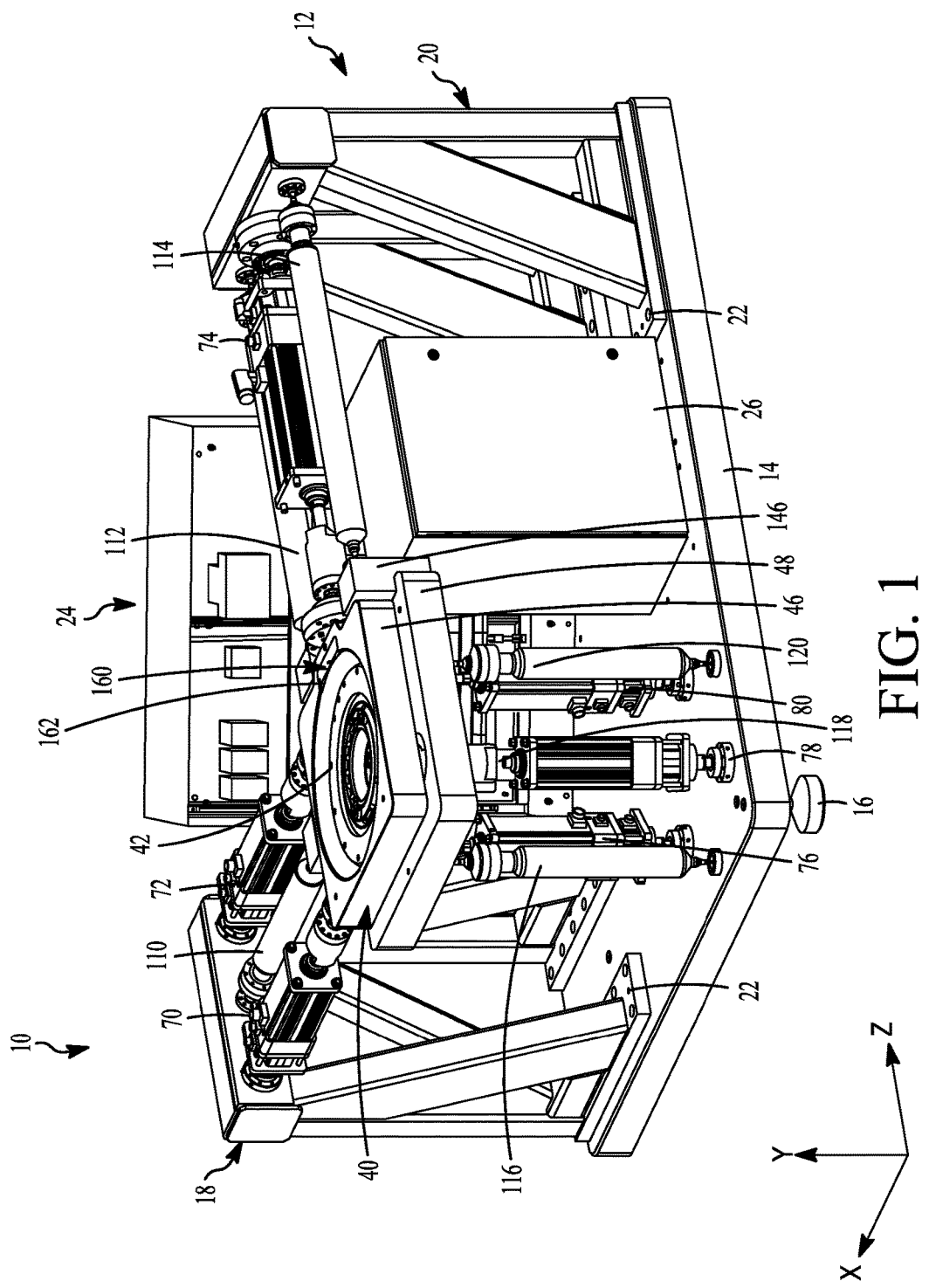
FIG. 1 is a perspective view of one implementation of a force transducer calibration apparatus.
Figure 2:
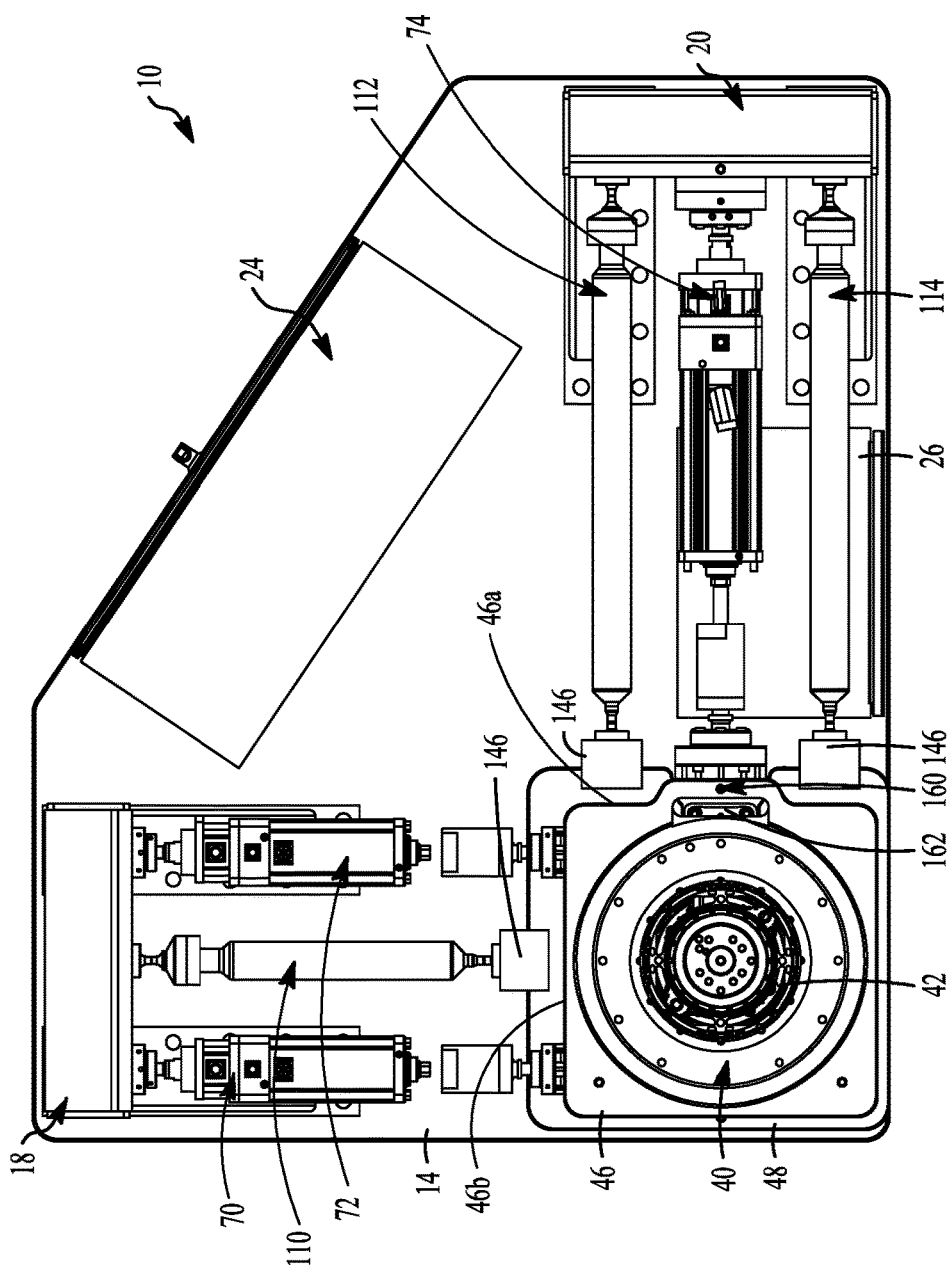
FIG. 2 is a top view of the force transducer calibration apparatus of FIG. 1.

Different aspects of the force transducer calibration apparatus 10 are shown in FIGS. 1-7. Reference is first made to FIGS. 1 and 2, where FIG. 1 is a perspective view of one implementation of a force transducer calibration apparatus 10, and FIG. 2 is a top view of the force transducer calibration apparatus 10 of FIG. 1.

The transducer calibration apparatus 10, also referred to as the calibration apparatus 10, includes a rigid structural frame 12 constructed, by example, of a base or platform 14 that may be supported directly on a floor or other horizontal surface or may be supported on a plurality of feet, such as the feet 16 mounted at outer peripheral corners of the base 14. (Not all feet 16 are shown.)

The frame 12 includes a pair of stanchions 18 and 20 formed of rigidly interconnected tubular frame members that are fixed to the base 14 by means of fasteners, such as bolts, extending through apertures formed in lower mounting flanges 22 on lower side portions of each stanchions 18 and 20. Other ways of coupling the pair of stanchions 18 and 20 to the frame 12 may be used. In this example, the stanchions 18 and 20 are spaced apart on the base 14 in a 90° offset orientation.

Optionally, the base 14 can support a cabinet 24 that houses the power electronics, including for example signal conditioners, that provide power to the force actuators described in further detail below. The base 14 can also support a controller 26, such as a CPU-based controller executing program instructions for operating the calibration apparatus 10. The cabinet 24 and the controller 26 may be integrated into a single device that is supported on the base 14, or may be housed together or separately at a location spaced from the base 144. The controller 26 is coupled to the power electronics within the cabinet 24 and to receive outputs from the force reaction sensors and other sensors described in additional detail hereinafter by appropriate wired or wireless communication means. Operation of the calibration apparatus 10 is discussed in additional detail below.

The calibration apparatus 10 includes a transducer holder 40. The transducer holder 40 may be configured to support many different size and shaped transducers, such as a large circular transducer 42 shown by example in FIGS. 5 and 6 and a smaller circular transducer 44 shown in another example in FIG. 7. Other possible shapes for transducers include rectangular and square transducers.

Figure 5:
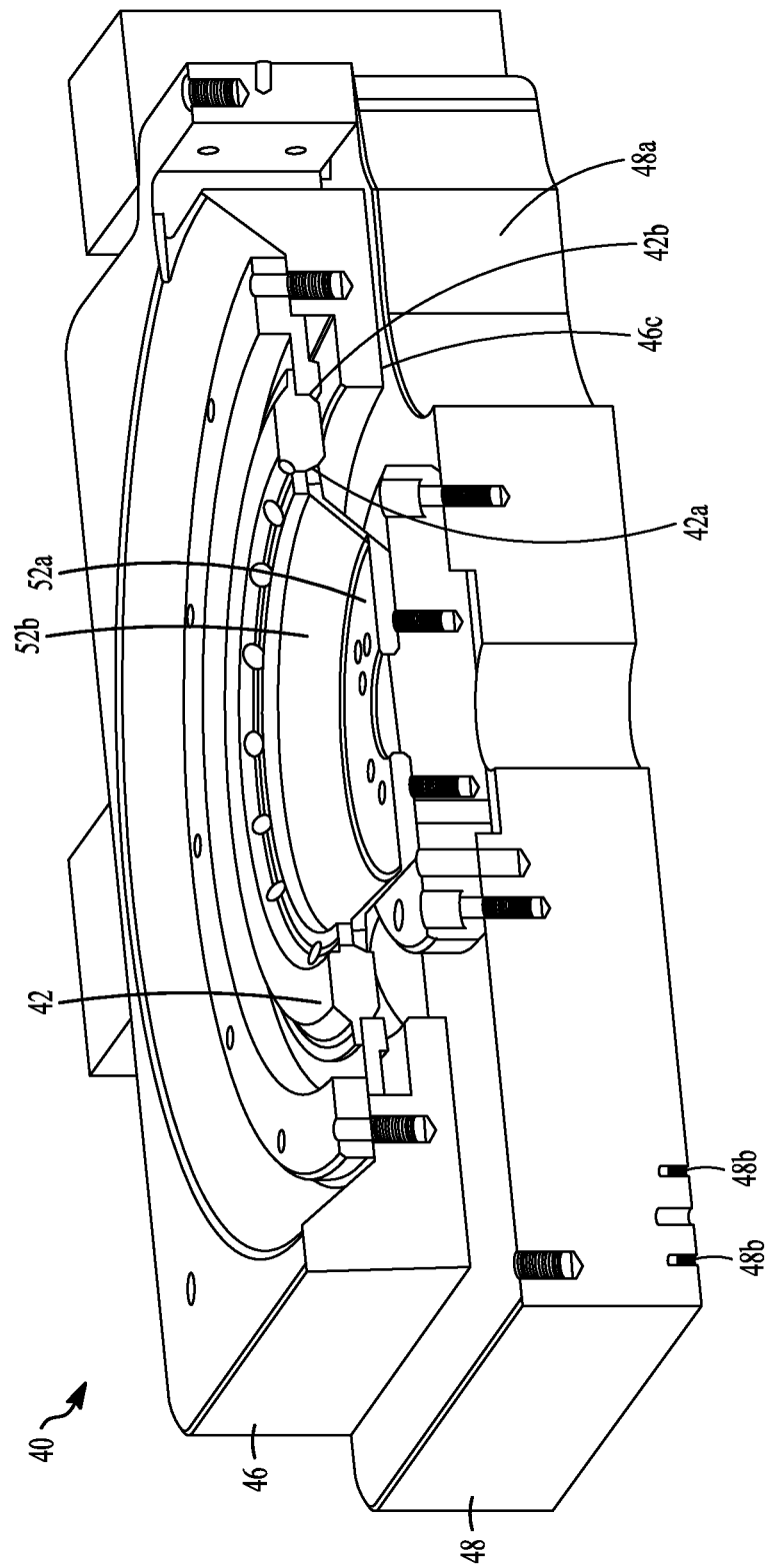
FIG. 5 is a partial perspective, partial cross-sectional view of a transducer holder according to the teachings herein.
Figure 6:
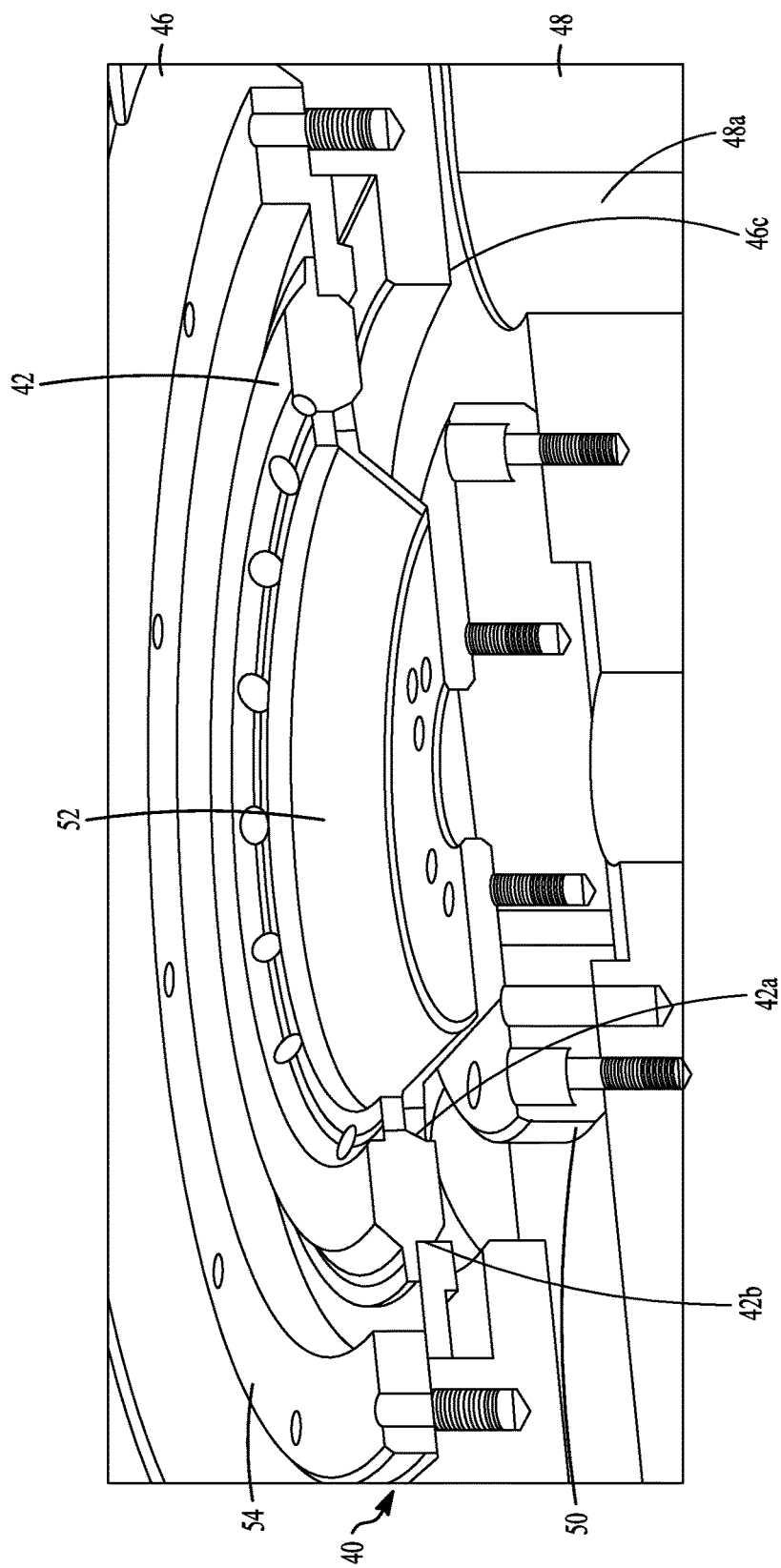
FIG. 6 is another partial perspective, partial cross-sectional view of the transducer holder according to FIG. 5.

Referring first to the partial perspective, partial cross-sectional views of the transducer 42 in FIGS. 5 and 6, the transducer holder 40 includes an upper lever plate 46 and a lower lever plate 48. Depending upon the size and shape of the transducer 42 to be mounted in the transducer holder 40, a lower, centrally-located support member 50 is fastened to the lower lever plate 48 about the center axis of the transducer holder 40. The lower member 50 supports a central disk-shaped member 52 in the case of the circular transducer 42, which engages an inner diameter surface 42a of the transducer 42. The central disk-shaped member 52 has an annular flat portion 52a supported by the lower member 50 and a sloped portion 52b extending from the annular flat portion 52a to the inner diameter surface 42a of the transducer 42. An outer, circular-shaped member 54, again corresponding to the circular shape of the transducer 42, is fixed by fasteners to the upper lever plate 46 and supports an outer edge 42b of the transducer 42.

Figure 7:
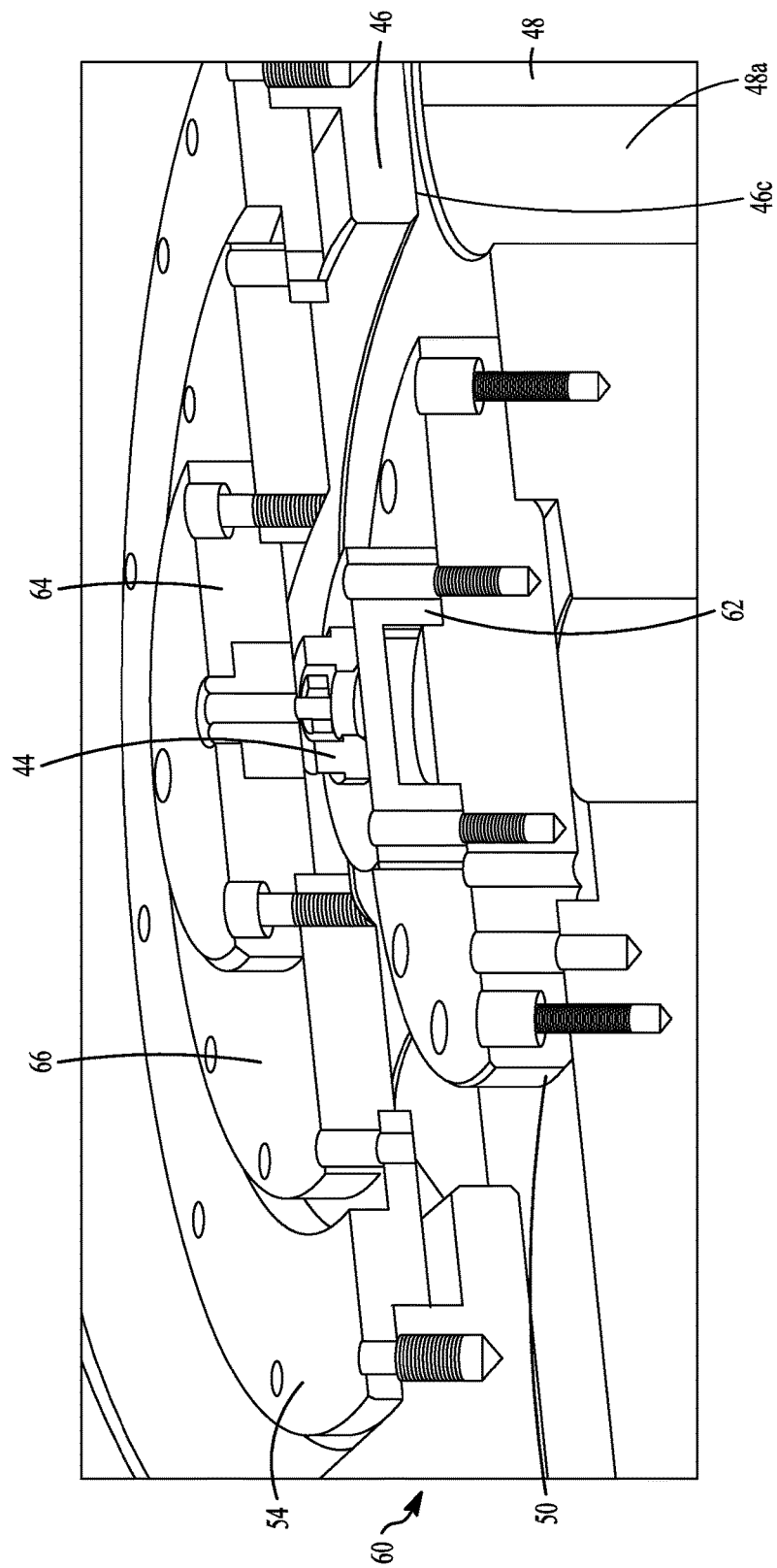
FIG. 7 is a partial perspective, partial cross-sectional view of another transducer holder according to the teachings herein.

FIG. 7 depicts another example of a transducer holder 60 that includes the upper and lower lever plates 46 and 48, with centrally located lower support member 50 and the outer member 54. Due to the smaller size of the transducer 44 within the transducer holder 60, a small, disk-shaped central support member 62 is fixed by fasteners to the central lower lever plate 48 and forms a base for supporting the transducer 44. An upper central member 64 engages an upper surface of the transducer 44 and is itself fixed by fasteners to a spacer member 66 that is fixed by fasteners to the outer support member 54.

Referring back to FIGS. 1 and 2, multiple actuators are mounted along X, Y and Z axes to apply force and moments to the transducer mounted in a transducer holder. In this way, for example, the force and moments are applied in various magnitudes and directions along various axes in order to calibrate the transducer 42 mounted in the transducer holder 40 or the transducer 44 mounted in the transducer holder 60.

By example only, a first pair of force actuators 70 and 72 are oriented and fixed between the stanchion 18 and the transducer holder 40 for applying force in either push or pulling direction along the X axis. Similarly, a force actuator 74 is fixed between the stanchion 20 and the transducer holder 40 for applying force in push or pulling directions along the Z axis. Three force actuators 76, 78, and 80 are mounted in a fixed configuration between the base 14 and the bottom surface (e.g., the upper lever plate 46) of the transducer holder 40 for applying moments to the transducer holder 40 and thereby to the transducer 42 along the Y axis.

Figure 3:
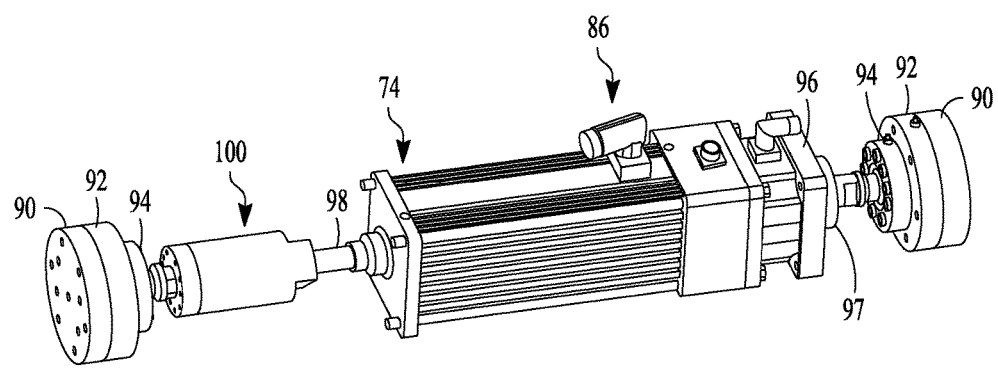
FIG. 3 is a perspective view of a force actuator of FIG. 1.

FIG. 3 is a perspective view of a force actuator of FIG. 1. Each force actuator, such as force actuator 74, includes a force actuator element 86 that can be actuated, as described hereafter, to apply a push or a pulling force in opposite directions on the transducer holder 40 and thereby on the transducer 42 mounted in the transducer holder 40. The force actuator element 86 may be a linear actuator, for example. The force actuator 74 can be fixed to one of the stanchions 18 and 20, or to the base 14, by a fastened or bolted connection formed of two disk-shaped members 90 and 92 that are bolted to each other. The disk-shaped member 92 receives a swivel 94 by a bolt extending between the member 92 and a mounting plate 96 fixed to one end of the force actuator element 86. Adjacent to the mounting plate 96 is a force transducer 97, such as any type of conventional load cell, which measures the force generated by the force actuator element 86.

The opposite end of the force actuator element 86 includes an extensible and retractable actuator rod 98 that is coupled through a linear bearing and spring assembly 100 to a similar swivel 94 and a second pair of disk-shaped members 92 and 90. The disk-shaped member 90 of each force actuator is affixed to one of vertically-extending, orthogonally-arranged surfaces 46a, 46b of the upper lever plate 46 of the transducer support 40, 60, or to the bottom surface 46c of the upper lever plate 46 through respective cut-outs 48a in the lower level plate 48 (see partial cut-out 48a in each of FIGS. 5-7). The disk-shaped member 90 is fixed by fasteners such as bolts. The end of each actuator rod 98 has a shape that fittingly engages with the linear bearing and spring assembly 100 so as to transfer force from the force actuator element 86 to the transducer holder 40 or 60, specifically a pushing or pulling force to the upper lever plate 46, which force is then transferred to the transducer.

Multiple force sensors are also mounted along the X, Y and Z axes between stanchions 18 and 20, the base 14 and the transducer holder 40. By example, a single force reaction sensor 110 is fixedly mounted between stanchions 18 and the transducer holder 40 and is oriented along the X axis equally spaced centrally between the first pair of force actuators 70 and 72. A pair of force reaction sensors 112 and 114 are similarly mounted between stanchions 20 and the transducer holder 40 for measuring forces applied on the transducer 42 along the Z axis.

Force reaction sensors, such as three force reaction sensors 116, 118, and 120 shown by example, are mounted between the base 14 and the bottom surface (e.g., lower lever plate 48) of the transducer holder 40 and interspersed between the three Y axis oriented force actuators 76, 78, and 80. In this example, the force actuators 76, 78, and 80 are spaced 120 degrees apart, and the force reaction sensors 116, 118, and 120 are spaced 120 degrees apart and equidistant between adjacent pairs of the force actuators 76, 78, and 80.

Figure 4:
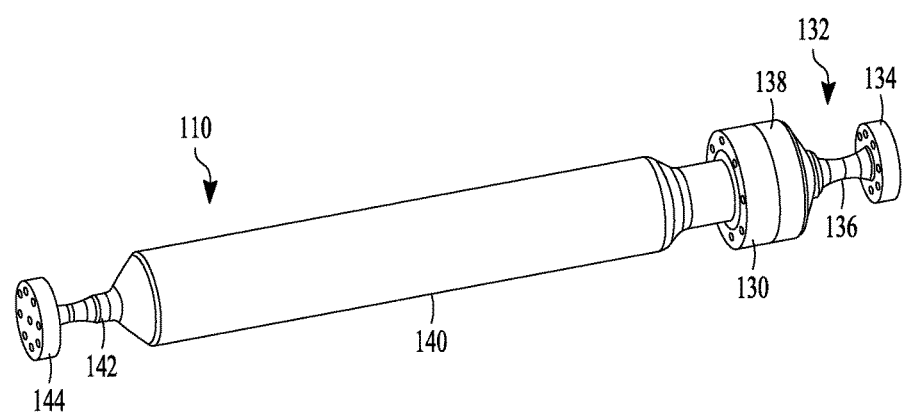
FIG. 4 is a perspective view of a force reaction sensor of FIG. 1.

As shown in detail in FIG. 4, each force reaction sensor, such as force reaction sensor 110, employs a force transducer 130, such as any type of conventional load cell, bolted to a one-piece flexure assembly or flexure 132. The flexure assembly 132 includes a disk-shaped mounting plate 134 that is fixed by fasteners, such as bolts, to one of the frame stanchion 18 or the frame stanchion 20. The mounting plate 134 supports a flexure element or flexure 136 that transitions into a second mounting member 138 bolted to the force transducer 130. A rigid, solid tubular member 140 is bolted at one end to the force transducer 130 and has an integral flexure member or flexure 142 at a second end that is coupled to a mounting plate 144. The mounting plate 144 of each of the force reaction sensors 110, 112, and 114 is fixed by fasteners, such as bolts and one or more pins, to a mounting block 146 (see FIGS. 1 and 2), which seats over an edge of the lower lever plate 48 and, in contact with load transducer 42. In this way, the force actuators 70, 72 are co-planar with the force reaction sensor 110, and the force actuator 74 is coplanar with the force reaction sensors 112 and 114. The two planes so defined may also be coplanar with each other. The mounting plate 144 of each of the force reaction sensors 116, 118, and 120 is fixed by fasteners, such as bolts and one or more pins, into receiving apertures 48b within a bottom surface of the lower lever plate 48 (see FIG. 5). Because the cut-outs 48a allow the force actuators 76, 78, and 80 to pass through the lower lever plate 48, the force reaction sensors 116, 118, and 120 are able to be mounted about a circular path.

Referring again to FIGS. 1 and 2, the upper lever plate 46 of the transducer holder 40 is formed with an enlargement 160 to which one end of the force actuator 74 that extends along the Z axis is fixed. A slot 162 extends partially from an upper surface of the upper lever plate 46 into the interior of the upper lever plate 46. The enlargement 160 and the slot 162 cooperate to spread out forces supplied by the single force actuator 74 over a larger area along one side surface (e.g., surface 46a) of the upper lever plate 46 to prevent a point force contact between the force actuator 74 and the transducer holder 40.

The control system in the transducer calibration apparatus 10 operates according to the controller 26 shown in FIG. 1. As mentioned above, the controller 26 may be a CPU-based controller executing program instructions for operating the calibration apparatus 10. For example, the controller 26 runs a graphical-based programming language, such as Lab-VIEW, executing program instructions to affect the desired calibration procedure on a transducer. The control system operates the entire calibration procedure and records the sensor output. This may include supplying forces to the transducer holder 40 from the force actuators through the power electronics mounted in the cabinet 24, and sensing the outputs by the force reaction sensors and by the transducer under test. A monitor can be used to display the outputs of the force actuators, reaction force sensors, and the transducer during the calibration procedure.

The control system can actuate any or all of the actuators in any combination. This gives the control system the ability to load the transducer 42 under calibration with any combination of forces and moments. For example, if actuators 70 and 72 apply a 50 pound force, the transducer 42 will undergo 100 pounds of loading. Alternatively, if actuator 70 applies a 50 pound compressive force and actuator 72 applies a 50 pound tension force, the transducer 42 will be loaded with a torque and no net force. Similar push and pull forces can be applied in any combination by the other actuators as well.

It will be understood that the X, Y and Z axis force actuators may be activated in any combination, such that a combination of forces and moments may be applied to the transducer 42 under calibration simultaneously. For example, if force actuators 76, 78, and 80 apply a tension force and force actuator 74 applies a compressive force, the transducer 42 under calibration will undergo a force in both the Y and Z directions. In a similar fashion, other combinations of actuator force make the simultaneous application of any combination of force and moments possible.

The transducer calibration apparatus 10 described above is designed to impose known loads on force transducers in optimal directions and with minimal or no reconfiguration required by the operator. Six force actuators may be provided to apply forces on the transducer. Six force reaction sensors may also be provided for redundant measurement of all forces and moments. That is, with the arrangement provided, the force applied by any force actuator or combination of force actuators can be measured by different force reaction sensors or different combinations of force reaction sensors. This allows the transducer calibration apparatus 10, itself, to be self-calibrating. The number of actuators and sensors may vary based on the number of sensing elements of the transducer.

The force actuators are aligned with the sensitive axes of the transducer to be calibrated in order to result in a negligible force in off axis directions.

The force actuators are supported on the same calibration apparatus base 14 as are force reaction sensors. This results in minimal fixture deflection which minimize unwanted cross-axis forces imposed upon the transducer during calibration.

Compliant elements are provided in the force actuators to reduce the rate of force change as a function of actuator position change. The compliant elements are implemented by the flexures 132, 136, and 142 in this example, and they can be installed or removed without major system change. The compliant elements improve the stability of the actuator control loop if the calibration apparatus is automated. There is also a provision for free movement of the force actuators over a small distance at zero force application. This allows a null force to be evident and prevents forces in the direction of the actuator when slight motion might be induced by deflections related to off-axis force applications.

Some transducers require cyclic loading to stabilize the transducer response prior to final calibration. The transducer calibration apparatus 10 can provide this desired cyclic loading. The calibration apparatus 10 can be programmed to simulate real world operations including "rolling" loads to replicate actual vehicle loading.

According to one implementation of the control system implemented by the controller 26, the calibration process begins by mounting a transducer within the transducer support 40, 60. The transducer may be, for example, a wheel load transducer such as that described in U.S. Pat. No. 6,324,919. The electronics for generating output voltages corresponding to the forces measured by the transducer may be mounted integrally with the transducer, as is done with the wheel load transducer of U.S. Pat. No. 6,324,919, or may be mounted within the transducer support 40, 60. The output voltages may be supplied to the controller 26, e.g., by wires extending through central apertures of the upper lever plate 46 and the lower lever plate 48 for use in calibrating the transducer. More specifically, and as described by the examples above, a force may be generated by one or more of the force actuators through signals from the controller 26 to the power electronics within the cabinet 34. The force generated may be controlled by feedback signals from the force transducers or load cells 97. Different levels of force may be generated for each axis over a range of force values to which the transducer is expected to measure, such as 500 to 3000 pounds of force in increments of 50 pounds.

The pushing and/or pulling forces are transferred to the upper lever plate 46, which is movable responsive to the forces. The movement of the upper lever plate 46, through the connection of its member 54 to the transducer, deforms the transducer to generate output voltages responsive to the forces. The deformation of the transducer also deforms the central disk-shaped member 52, which in turn generates a force in the lower lever plate 48. The generated force is measured by the reaction force sensors.

The output voltages from the sensing elements of the transducer may be measured at different levels of force generated for each axis to determine whether the measured forces, as indicated by the output voltages, are within acceptable ranges. Ideally, the forces measured by the force transducers or load cells 130 are equal to those measured by the force transducers or load cells 97. However, they vary for various reasons, including the reason that the points of measurement differ. The output voltages from the sensing elements of the transducer may be compared to the outputs from the force transducers or load cells 97. It is more preferable that the output voltages of the sensing elements of the transducer be compared to the outputs from the force transducers or load cells 130 because the outputs of the force transducers or load cells 130 are closer to the forces seen by the transducer.

The comparison may be done by converting the output voltages from the transducer sensors to force values based on conversion formulas or tables. When the force values are outside of a range of acceptable variations from those output from the transducers or load cells 130, the transducer is not calibrated. The transducer may be rejected, or the transducer may be calibrated by correlating its output voltage(s) to the measured force value(s).

As mentioned, the forces measured by the force transducers or load cells 130 are ideally equal to those measured by the force transducers or load cells 97. Thus, the calibration apparatus 10 can self-calibrate by comparing the forces measured by the force transducers or load cells 130 with the force transducers or load cells 97. When the variations are outside ranges determined by, e.g., experimentation, problems with one or more of the force actuators or reaction force sensors may be detected.

Because it is desirable that accuracy be maintained over an extended period of time, these reference load cells may be certified to be accurate within a specified amount to, such as one tenth of a percent of full scale. In this example, a reference cell rated at 10,000 lbs. of force would be accurate within 10 lbs. or less throughout the range from zero to 10,000 lbs. When both apply force and reaction force reference cells are included, any changes in sensitivity of a cell is evident as the pushing measurement should be substantially the same as the pulling measurement. This provides another self-calibration check.

As a further system check, an external reference transducer can be incorporated as a, e.g., periodic additional verification of the accuracy of the calibration system 10.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A force transducer calibration apparatus, comprising:
   a base;
   a pair of end stanchions fixed on the base;
   force actuators mounted between the base, the pair of end stanchions, and a transducer holder, the force actuators arranged to exert forces and moments on a transducer mounted in the transducer holder; and
   force reaction sensors fixed between the base, the pair of end stanchions, and the transducer holder for measuring forces and moments experienced by the transducer holder.

2. The force transducer calibration apparatus of claim 1, wherein:
   the force actuators and the force reaction sensors are mounted along X, Y and Z axes.

3. The force transducer calibration apparatus of claim 1, further comprising:
   a controller coupled to force actuators and the force reaction sensors for applying selective forces and moments on the transducer, and for recording forces measured by the force reaction sensors.

4. The force transducer calibration apparatus of claim 1, wherein:
   at least one of the force actuators is mounted between the base, the pair of end stanchions and the transducer holder along each of X, Y and Z axes.

5. The force transducer calibration apparatus of claim 1, wherein at least one of the force reaction sensors comprises:
   a rigid tubular member;
   a pair of flexures mounted on opposite ends of the tubular member; and
   a force transducer coupled between one of the flexures and the tubular member for measuring forces applied by the force reaction sensors on a transducer in the transducer holder.

6. The force transducer calibration apparatus of claim 1, wherein:
   a force actuator of the force actuators comprises a linear actuator having an extensible and retractable rod, the apparatus further comprising:
   end connections coupled to one end of the linear actuator and one end of a tubular member for swivelly connecting the force actuator between one of the end stanchions and the transducer holder; and
   a compliant member interposed between the tubular member and one of end connections.

7. The force transducer calibration apparatus of claim 1, further comprising:
   each of the force actuators including a load cell measuring a force generated by the force actuator; and
   a controller configured to control the forces and moments exerted on the transducer mounted in the transducer holder using feedback from the load cells.

8. The force calibration apparatus of claim 1, wherein:
   the transducer holder comprises an upper lever plate to which each of the force actuators is coupled, and a lower lever plate to which each of the reaction force sensors is coupled; and
   the upper lever plate and the lower lever plate are arranged to couple the transducer therebetween.

9. A force transducer calibration apparatus, comprising:
   a base;
   a first end stanchion fixed on the base;
   a second end stanchion fixed on the base;
   a first force actuator mounted between the base and a transducer holder, the transducer holder configured to support a transducer;
   a first reaction force sensor mounted between the base and the transducer holder;
   a second force actuator mounted between the first end stanchion and the transducer holder;
   a second reaction force sensor mounted between the first end stanchion and the transducer holder;
   a third force actuator mounted between the second end stanchion and the transducer holder; and
   a third reaction force sensor mounted between the second end stanchion and the transducer holder; wherein the first force actuator and the first reaction force sensor are arranged orthogonally to the second force actuator and the second reaction force sensor, and to the third force actuator and the third reaction force sensor.

10. The force transducer calibration apparatus of claim 9, further comprising:
a controller that controls the first force actuator, the second force actuator, and the third force actuator to exert at least one of a force or a moment on the transducer holder to thereby deform the transducer, and that receives at least one of a force or a moment measured by the first reaction force sensor, the second reaction force sensor, and the third reaction force sensor.

11. The force transducer calibration apparatus of claim 9, further comprising:
a controller that receives at least one of a force or a moment measured by the first reaction force sensor, the second reaction force sensor, and the third reaction force sensor for comparison with outputs of the transducer mounted in the transducer holder.

12. The force transducer calibration apparatus of claim 9, further comprising:
a fourth force actuator mounted between the base and the transducer holder;
a fifth force actuator mounted between the base and the transducer holder, the fourth force actuator and the fifth force actuator mounted in parallel with the first force actuator;
a fourth force reaction sensor mounted between the base and the transducer holder;
a fifth force reaction sensor mounted between the base and the transducer holder, the fourth force reaction sensor and the fifth force reaction sensor mounted in parallel with the first force reaction sensor;
a sixth force actuator mounted between the first end stanchion and the transducer holder, the sixth force actuator mounted in parallel with the second force actuator and the second force reaction sensor; and
a sixth force reaction sensor mounted between the second end stanchion and the transducer holder, the sixth force reaction sensor mounted in parallel with the third force actuator and the third force reaction sensor.

13. The force transducer calibration apparatus of claim 9, wherein:
the transducer holder comprises a first plate and a second plate arranged to couple the transducer therebetween;
each of the first force actuator, the second force actuator, and the third force actuator is coupled to the first plate; and
each of the first force reaction sensor, the second force reaction sensor, and the third force reaction sensor is coupled to the second plate.

14. The force transducer calibration apparatus of claim 9, further comprising:
each of the first force actuator, the second force actuator, and the third force actuator including a load cell detecting a generated force;
a controller receiving the generated force to control at least one of a force and a moment applied by the first force actuator, the second force actuator, and the third force actuator to the transducer holder.

15. A force transducer calibration apparatus, comprising:
a base;
a first end stanchion affixed to the base;
a second end stanchion affixed to the base;
a transducer holder, the transducer holder coupled to the base by at least one force actuator and at least one reaction force sensor, the transducer holder coupled to the first end stanchion by at least one force actuator and at least one reaction force sensor, and the transducer holder coupled to the second end stanchion by at least one force actuation and at least one reaction force sensor; and
a controller that controls the force actuators to exert at least one of a force or a moment on the transducer holder to thereby deform a transducer, and that receives at least one of a force or a moment measured by the reaction force sensors for comparison with outputs from the transducer.

16. The force transducer calibration apparatus of claim 15, wherein:
each force actuator includes a load cell; and
the controller is configured to receive output from the load cell from each force actuator to control a level of the at least one of the force or the moment exerted on the transducer holder.

17. The force transducer calibration apparatus of claim 15, wherein:
the at least one force actuator and the at least one reaction force sensor coupling the transducer holder to the base are arranged about a circumference of a circle;
the at least one force actuator and the at least one reaction force sensor coupling the transducer holder to the first end stanchion are arranged in a first plane; and
the at least one force actuator and the at least one reaction force sensor coupling the transducer holder to the second end stanchion are arranged in a second plane.

18. The force transducer calibration apparatus of claim 17, wherein:
the first plane and the second plane are coplanar.

19. The force transducer calibration apparatus of claim 15, wherein a force reaction sensor comprises:
a rigid tubular member;
a pair of flexures mounted on opposite ends of the tubular member; and
a load cell coupled between one of the flexures and the tubular member, the load cell comprising both apply force and reaction force reference cells to measure pushing and pulling forces for calibration of the apparatus.

20. The force transducer calibration apparatus of claim 15, wherein a force actuator comprises:
a linear actuator having an extensible and retractable rod;
a first end connection coupled to the extensible and retractable rod and to the transducer holder;
a load cell coupled to the linear actuator between the first end connection and the first end connection; and
a second end connection coupled to the linear actuator and to one of the end stanchions through a linear bearing and spring assembly.

* * * * *